United States Patent [19]
Kazami et al.

[11] Patent Number: 5,625,429
[45] Date of Patent: Apr. 29, 1997

[54] CAMERA WITH COMMUNICATIONS CAPABILITY WITH AN EXTERNAL DEVICE

[75] Inventors: Kazuyuki Kazami, Tokyo; Norikazu Yokonuma, Kanagawa-ken; Hideo Hibino, Kanagawa-ken; Youichi Yamazaki, Kanagawa-ken, all of Japan

[73] Assignee: Nikon Corporation, Tokyo, Japan

[21] Appl. No.: 358,461

[22] Filed: Dec. 19, 1994

[30] Foreign Application Priority Data

Dec. 27, 1993  [JP]  Japan .................................. 5-333618
Dec. 27, 1993  [JP]  Japan .................................. 5-333619
Dec. 27, 1993  [JP]  Japan .................................. 5-333620
Dec. 27, 1993  [JP]  Japan .................................. 5-333622

[51] Int. Cl.[6] ................................................. G03B 29/00
[52] U.S. Cl. ........................................ 396/300; 396/429
[58] Field of Search .................................. 354/21, 289.1, 354/289.12, 412, 76

[56] References Cited

U.S. PATENT DOCUMENTS

| | | | |
|---|---|---|---|
| 4,454,414 | 6/1984 | Benton | 235/379 |
| 4,714,332 | 12/1987 | Eguchi et al. | 354/21 |
| 4,887,105 | 12/1989 | Ishikawa et al. | 354/21 |
| 4,945,365 | 7/1990 | Fujino | 354/21 |
| 5,032,854 | 7/1991 | Smart et al. | 354/21 |

*Primary Examiner*—Safet Metjahic
*Assistant Examiner*—J. K. Han
*Attorney, Agent, or Firm*—Oliff & Berridge

[57] ABSTRACT

A camera communicates with an external device using light signals that are transmitted using one or more photoelectric elements. Preferably, the communications are facilitated by using one or more camera photoelectric elements located in a cartridge chamber of the camera, which usually is used to receive a film cartridge. The one or more camera photoelectric elements usually are used to read a bar code on the film cartridge. In order to perform data communications with the external device, a dummy cartridge, which is linked to the external device, is placed in the cartridge chamber and includes one or more cartridge photoelectric elements that oppose the one or more camera photoelectric elements when placed in the cartridge chamber. Communications can take place in one or both directions between the camera and the external device.

39 Claims, 14 Drawing Sheets

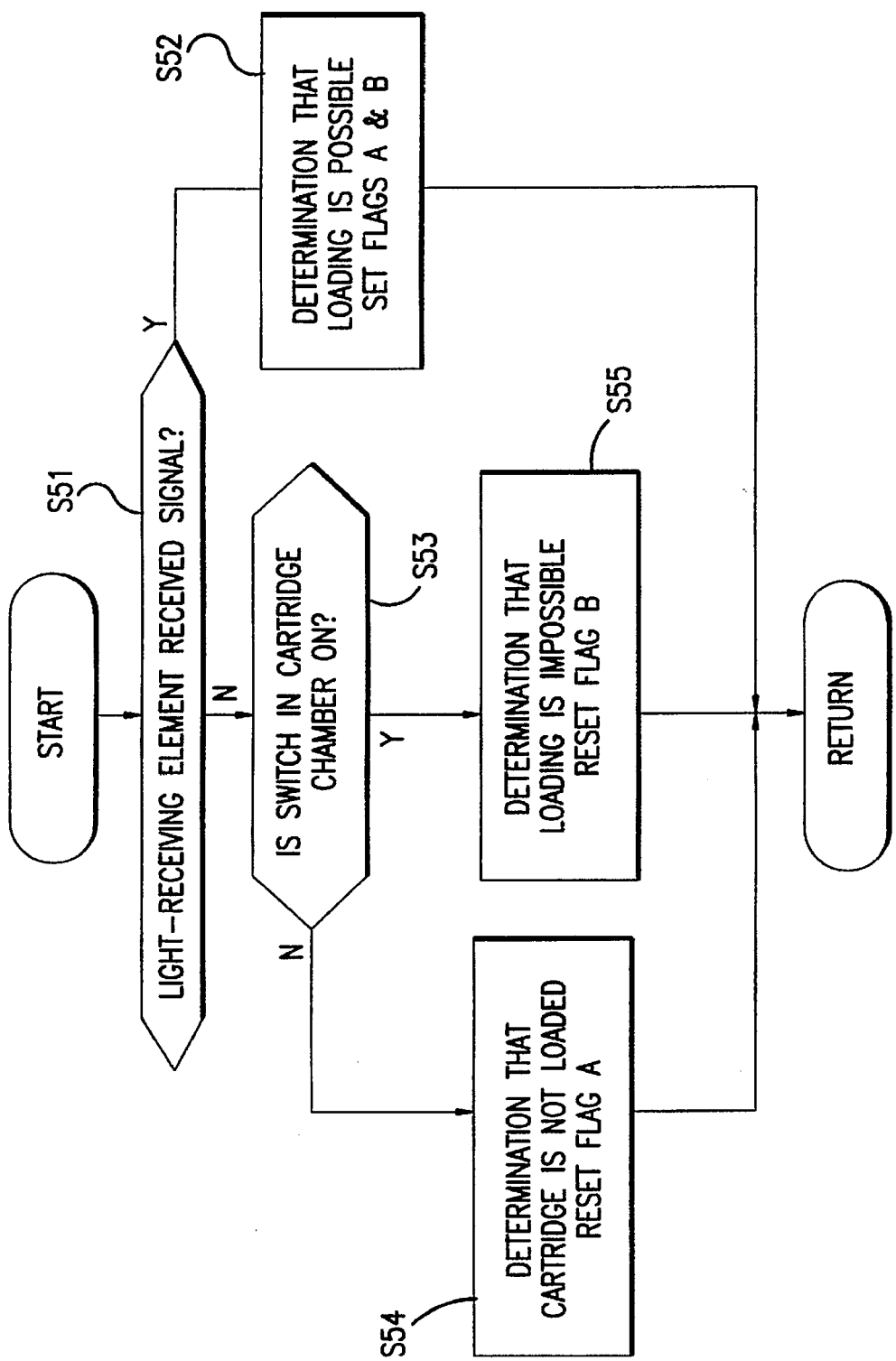

CAMERA WITH COMMUNICATIONS CAPABILITY WITH AN EXTERNAL DEVICE

BACKGROUND OF THE INVENTION

1. Field of the Invention

The present invention relates to a camera that can perform data communication with external devices, and, in particular, to such cameras that use a dummy film cartridge to perform data communication with the external devices.

2. Description of Related Art

U.S. Pat. No. 5,032,854 discloses a camera in which a bar code pattern is provided on the top surface of a film cartridge for relating information about the film, including the number of exposures and the film sensitivity, to the camera. The bar code pattern is read by a photo-reflector provided within the camera. In addition, a camera is known in which a DX code indicating the film sensitivity and related information, which is provided on the side surface of the film, is read by a device disposed within the camera.

Because variations exist in the properties of photometry elements used in cameras for automatic exposure the need arises for the input of adjustment values into each camera in order to ensure proper camera performance. In addition, during shipping tests of cameras, lens driving tests and shutter opening and closing tests must be conducted by controlling the camera using an external device, such as a personal computer. Furthermore, the camera may need to transmit data to the external device in order to record photographic conditions such as the exposure value or similar parameters.

In these cases, it has been proposed to provide a terminal on the camera for data communication purposes that can be connected to an external device. Providing such a terminal, however, raises costs and increases the size of the camera.

Alternatively, it has been proposed to perform data communication with the camera by providing a dummy cartridge having the same shape as the film cartridge and that fits in the cartridge chamber. A DX code terminal is provided on the dummy cartridge for data communication with the camera. This method offers the advantage that a previously existing connection terminal provided in the camera for use with DX code input can also be used for data communication purposes. However repeatedly inserting and removing the dummy cartridge causes friction on the connection components that can result in poor electrical contact.

SUMMARY OF THE INVENTION

It is an object of embodiments of the present invention o provide for communications between a camera ant an external device without requiring any additional connectors in the camera to link with the external device.

It is another object of embodiments of the present invention to provide for communications between a camera and an external device without using connectors that become worn from excessive use.

In order to achieve the above and other objects, and to overcome the deficiencies in conventional devices, at least one camera photoelectric element located in a film cartridge chamber of he camera is used to communicate with an external device. The at least one photoelectric element preferably is part of a photoreflector provided in the camera so that the camera can read indicia, such as, for example, a bar code, from a regular film cartridge that can be placed in the camera cartridge chamber. Preferably, the camera includes a controller coupled with the at least one camera photoelectric element, the controller determining whether to communicate with the external device using the at least one camera photoelectric element. The controller communicates with the external device by transmission of light signals using the at least one camera photoelectric element when the controller determines to communicate with the external device.

Preferably, the external device includes a dummy cartridge that is insertable into the film cartridge chamber of the camera. The dummy cartridge includes at least one cartridge photoelectric element located on the dummy cartridge so that the cartridge photoelectric element opposes the camera photoelectric element when the dummy cartridge is inserted into the film cartridge chamber of the camera.

In ore embodiment the controller can determine whether to communicate with the external device by determining whether the camera photoelectric element receives a light signal within a predetermined time period after actuation of the camera photoelectric element. In such an embodiment the camera photoelectric element includes at least a light-receiving element. The light signal received within the predetermined time period is transmitted by the external device through the at least one cartridge photoelectric element, which includes at least one cartridge light-emitting element.

The at least one camera photoelectric element can include at least one light-emitting element, in which case the controller can send data in the form of light signals to the external device with the at least one light-emitting element. The at least one cartridge photoelectric element would include at least one cartridge light-receiving element to receive the light signals from the camera.

The at least one camera photoelectric element can further include at least one camera light-receiving element, and the at least one cartridge photoelectric element can further include at least one cartridge light-emitting element. The at least one cartridge light-emitting element would be located on the dummy cartridge so that the at least one cartridge light-emitting element opposes the at least one camera light-receiving element when the dummy cartridge is inserted into the film cartridge chamber of the camera. In this case, the controller can receive data in the form of light signals from the external device with the at least one camera light-receiving element.

When the at least one camera photoelectric element is at least one camera light-emitting element, and the at least one cartridge photoelectric element includes at least one cartridge light-receiving element, the camera can also include a clock signal generating circuit that transmits a clock signal to the external device through the at least one camera light-emitting element and the at least one cartridge light-receiving element. The at least one camera photoelectric element can further include at least one camera light-receiving element, and the at least one cartridge photoelectric element can further include at least one cartridge light-emitting element that is located on the dummy cartridge so that the at least one cartridge light-emitting element opposes the at least one camera light-receiving element when the dummy cartridge is inserted into the film cartridge chamber. The controller can receive data in the form of light signals from the external device through the at least one camera light-receiving element and the at least one cartridge light-emitting element. When the at least one camera light-emitting element includes a first camera light-emitting element and a second camera light-emitting element, the clock signal generating circuit can transmit the clock signal to the external device with the first camera light-emitting element, and send data in the form of light signals to the external device with the second camera light-emitting element.

BRIEF DESCRIPTION OF THE DRAWINGS

The invention will be described in conjunction with the following drawings in which like reference numerals designate like elements and wherein:

FIG. 7 is a flowchart showing the cartridge information detection process executed by the CPU.

DETAILED DESCRIPTION OF PREFERRED EMBODIMENTS

Figure 1:
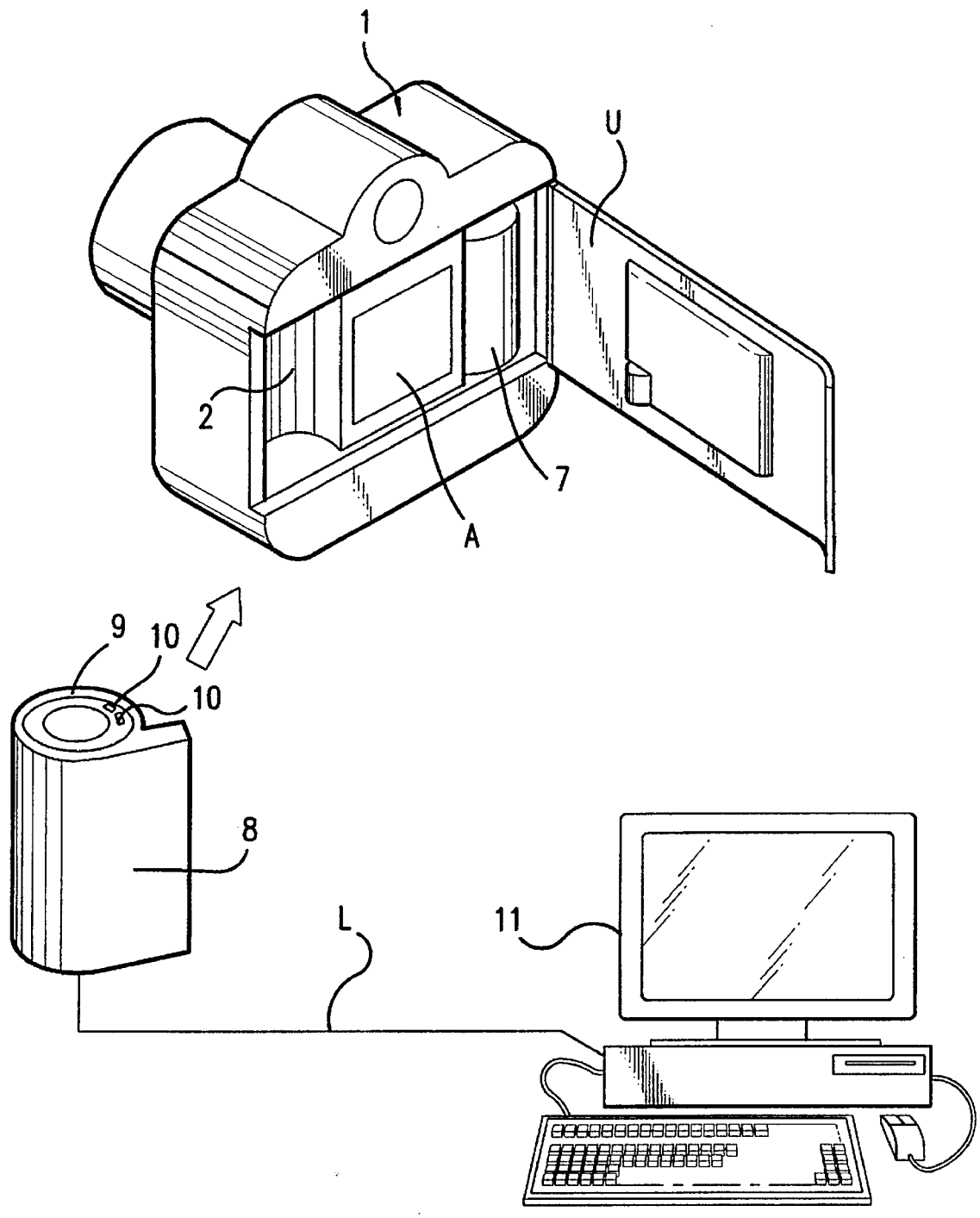
FIG. 1 is a perspective view of a camera, a dummy cartridge, and an external device (a personal computer) that form a camera communication control system according to an embodiment of the invention.
Figure 2:
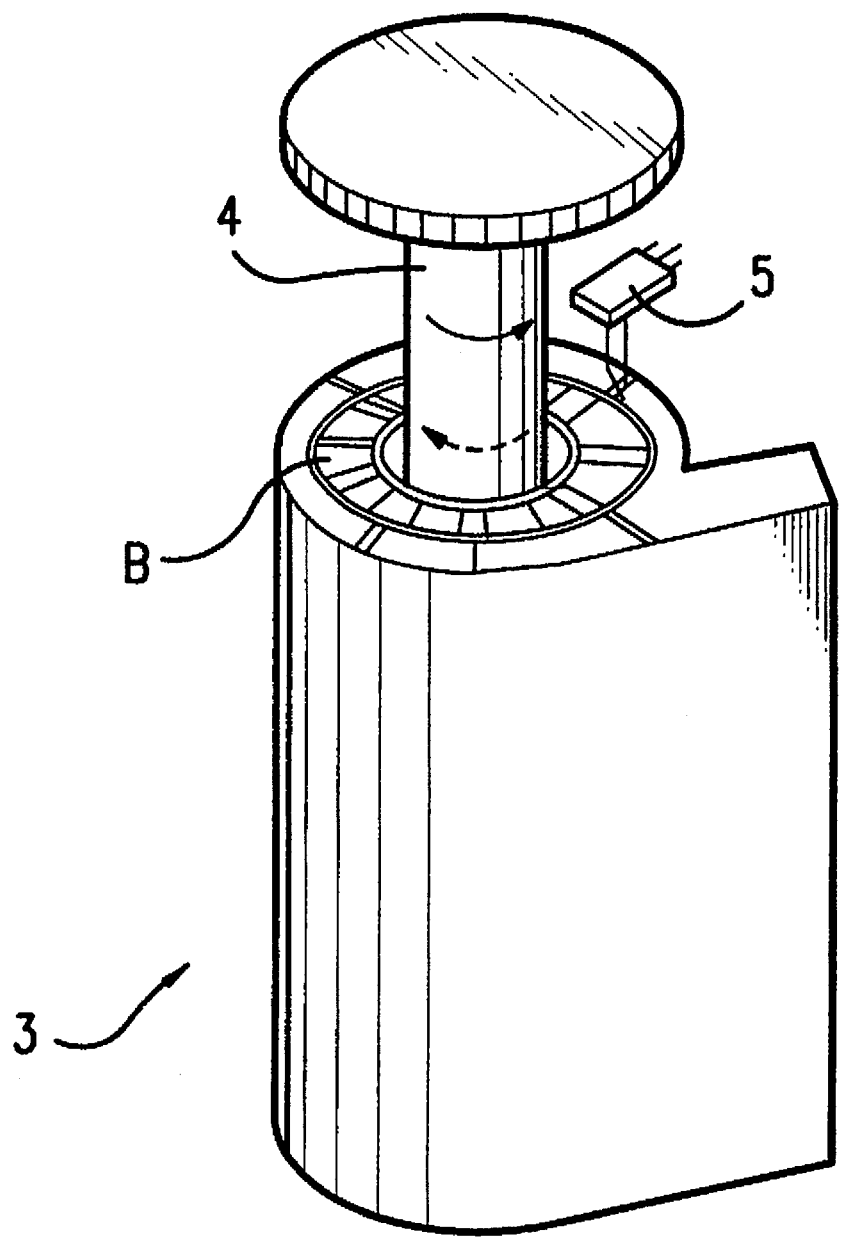
FIG. 2 is a diagram showing the positional relationship between a film cartridge and a photo-reflector in a camera.

A first embodiment of the present invention is explained below with reference to FIGS. 1 to 8. FIG. 1 shows the basic structure of the optical control system in a camera, and FIG. 2 shows the positional relationship between the film cartridge and the photo-reflector disposed within the camera. In FIG. 1, reference numeral 1 designates the camera. A cartridge chamber 2 is provided in the back of the camera i for receiving a film cartridge 3 (hereinafter referred to as the "cartridge"). As shown in FIG. 2, a spool driving unit 4 is provided in the cartridge chamber Z for the purpose of controlling the winding and unwinding of the film within the cartridge 3. A photo-reflector 5 that is used to read film information and perform data communication with external devices is mounted at the top of the cartridge chamber 2. The cartridge 3 is a conventional photography cartridge. A bar code pattern B that indicates information relating to the film is affixed to or drawn on the top surface of the cartridge 3.

The photo-reflector 5, as shown in FIG. 2, includes a light-emitting element that emits an optical signal of a predetermined wavelength, and a light-receiving element that receives optical signals from the outside of the photo-reflector 5. When a normal film cartridge 3 is loaded in the cartridge chamber 2 and the spool driving unit 4 is rotated, film is fed from the cartridge 3 to the winding spool 7 across an aperture A (FIG. 1).

A dummy cartridge 8 having the same shape as the conventional film cartridge 3 can be loaded in the cartridge chamber 2. A disk 9 is provided on the top surface of the dummy cartridge. A photo-reflector 10 is mounted at a predetermined location on the disk 9 so that when the dummy cartridge 8 is loaded in the cartridge chamber 2, the photo-reflector 10 is positioned opposite the photo-reflector 5 of the camera 1. In particular, a light-emitting element of dummy cartridge photo-reflector 10 is opposed to a light-receiving element of the camera photo-reflector 5, while a light-receiving element of the dummy cartridge photo-reflector 10 is opposed to a light-emitting element of the camera photo-reflector 5. A personal computer 1i (hereinafter referred to as the "PC") is connected to the dummy cartridge 8 via a communications line L. (Alternatively, PC 11 could communicate with dummy cartridge 8 wirelessly.)

Figure 3:
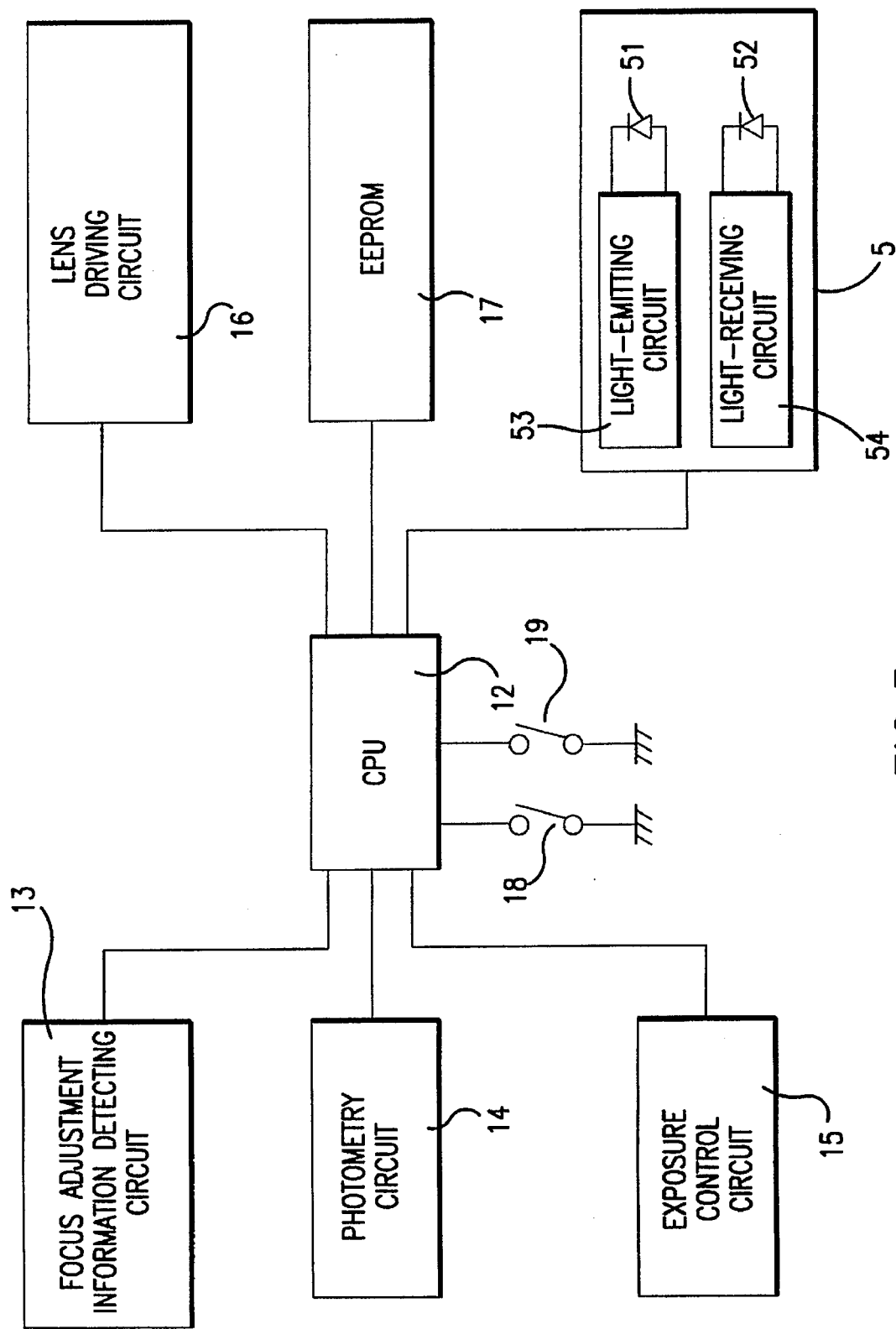
FIG. 3 is a block diagram of a first embodiment of a camera with communications capability.

FIG. 3 depicts the internal circuitry of the camera shown in FIG. 1, in which structures not directly related to the present invention have been omitted. The photo-reflector 5 includes a light-emitting element 51 and a light-receiving element 52 that are each connected to a CPU 12 by a light-emitting circuit 53 and a light-receiving circuit 54, respectively. The light-emitting element 51 and light-receiving element 52 can be photoelectric diodes, for example.

The CPU 12 is also connected to: a focus adjustment information detection circuit 13 that detects focus adjustment information, a photometry circuit 14 that measures the brightness of the subject, and an exposure control circuit 15 that controls the diaphragm and shutter speed in accordance with the measured brightness of the subject. A lens driving circuit 16 that causes the shooting lens to move according to the detected focus adjustment information and an EEPROM 17 that stores adjustment values and other settings for each of the camera components are also connected to the CPU 12. In addition, the CPU 12 is connected to a main switch 18 that starts the operation of the camera and a back cover detection switch 19 that detects whether the back cover U of the camera is closed.

Figure 4:
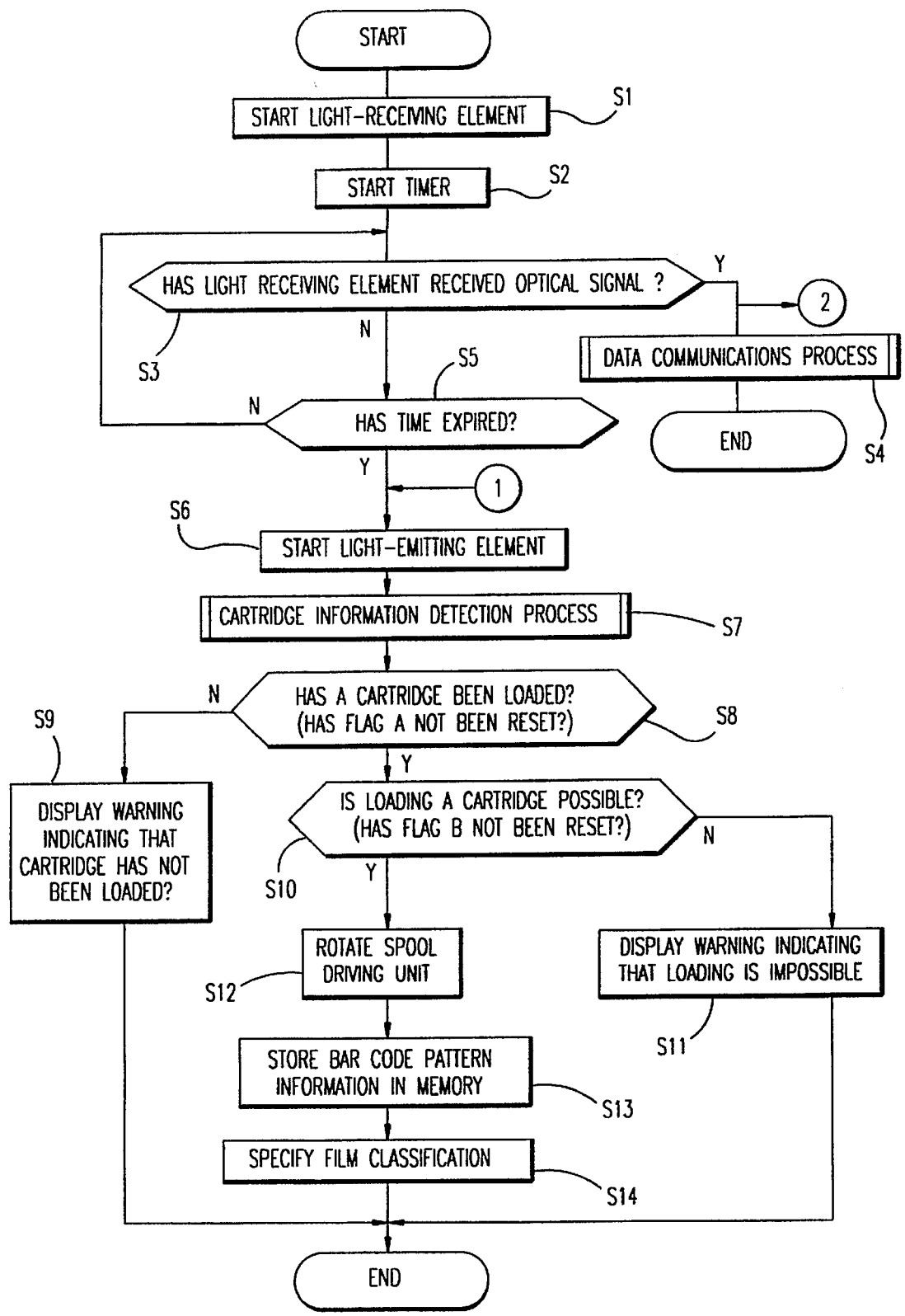
FIG. 4 is a flowchart showing processes performed by the CPU according to the first embodiment of the invention.

FIG. 4 is a flowchart showing processes performed by the CPU 12. The CPU 12 begins the processes in FIG. 4 when the CPU detects that the back cover U of the camera is closed using a back cover detection switch 19 (FIG. 3). In step S1, the CPU sends a start signal to the light-receiving circuit 54, causing the light-receiving element of the photo-reflector 5 to commence operation. The light-receiving element 52 starts the light-receiving operation, and when an optical signal is received, the received optical signal is converted into an electrical signal by the light-receiving element 52. The electrical signal is converted into a digital signal by the light-receiving circuit 54 and is input into the CPU 12. In step S2, a timer, which can be, for example, part of the CPU 12, is started. The timer measures the time that has elapsed since the light-receiving element 52 started the light-receiving operation.

In step S3, a determination is made as to whether the light-receiving element 52 has received an optical signal. The determination is made based upon whether a digital signal from the light-receiving element 52 has been input into the CPU 12. If the determination is affirmative, it is determined that the dummy cartridge 8 has been loaded to perform data communication, so the CPU 12 advances to step S4 and performs the data communication processes shown in FIGS. 5 and 6, as explained below in the following paragraphs. In other words, when a conventional cartridge is loaded, the light-receiving element 52 does not receive an optical signal because the light-emitting element 51 did not emit an optical signal. Similarly, when no cartridge is loaded, no optical signal is received by element 52. Consequently, when an optical signal is received, a determination is made that data communication is to take place because an optical signal can only be received when the dummy cartridge 8 is loaded and outputs an optical signal.

If the determination in step S3 is negative, the CPU advances to step S5 and determines whether the time has expired, i.e., whether a predetermined time interval has elapsed since the light-receiving element 52 was started. If the determination is negative, the CPU returns to step S3. If the determination is affirmative, the CPU advances to step S6. In this manner, when an optical signal is not input into the light-receiving element 52 after a predetermined time interval has elapsed after the back cover U has been closed, a determination is made that data communication will not take place, and the cartridge information identification process starting with step S6, i.e. the determination of whether the cartridge 3 can be loaded and the reading of the film information, are performed.

In step S6, a start signal is sent to the light-emitting circuit 53. Upon receiving the start signal, the light-emitting element 51 begins emitting light into the cartridge chamber 2. In step S7, a determination is made as to whether a cartridge 3 is loaded in the cartridge chamber 2 using the cartridge information detection process shown in FIGS. 7 and 8 and explained in the following paragraphs. In addition, a determination is made as to whether the cartridge 3 can be loaded, i.e. whether or not photography is possible.

Figure 8:
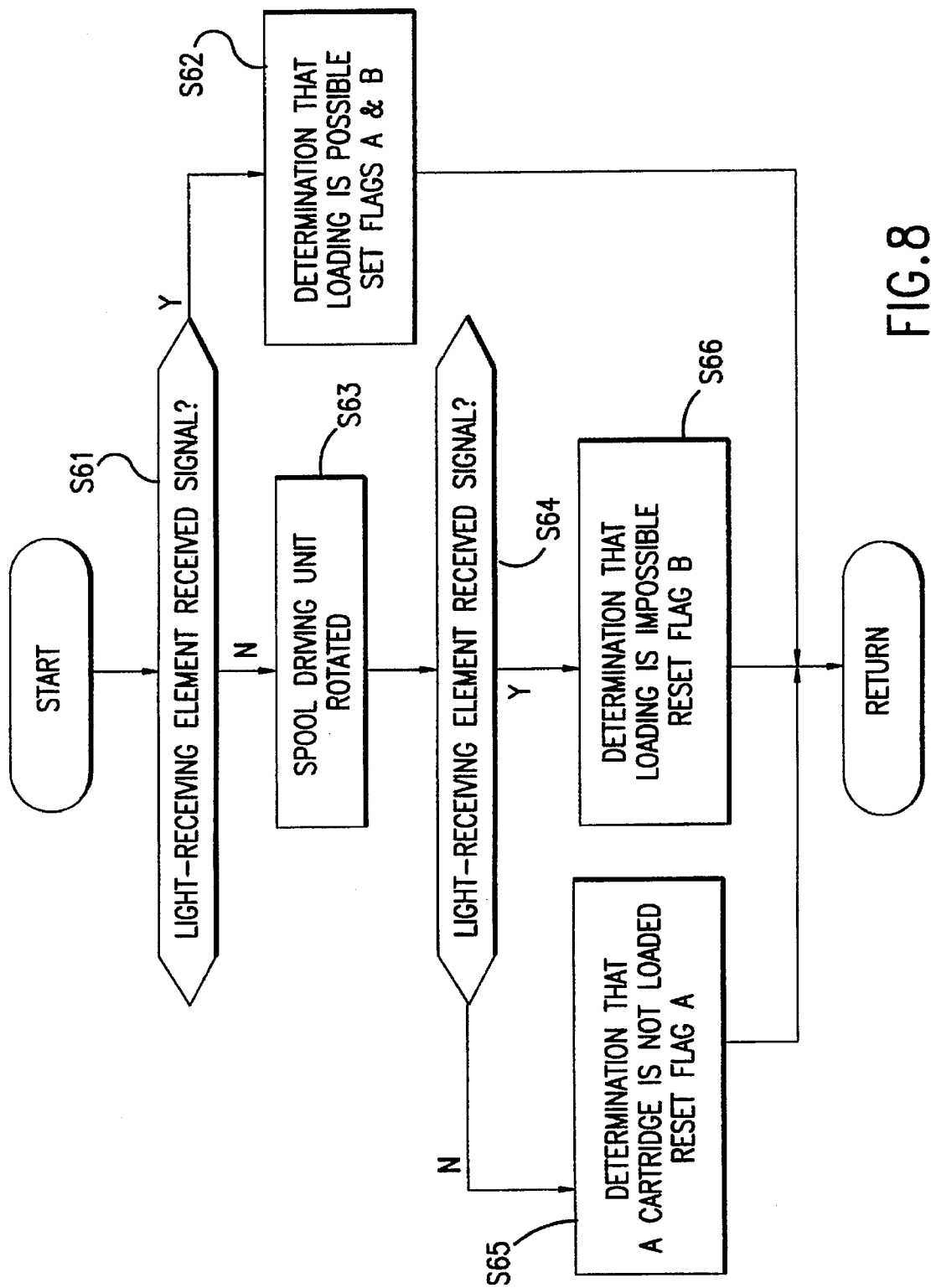
FIG. 8 is a flowchart showing the cartridge information detection process executed by the CPU.

In step S8, a determination is made as to whether a cartridge 3 is loaded in the cartridge chamber 2 by determining whether or not a flag A has been set using the processes in FIGS. 7 and 8. If the determination is negative, the CPU advances to step S9 and concludes the process by displaying a warning to the effect that a cartridge has not been loaded. In other words, this determination is negative if, for instance, a dummy cartridge is loaded, a cartridge without a bar code designation is loaded, or if no cartridge is loaded. If the determination in step S8 is affirmative, the CPU advances to step S10 and a determination is made as to whether loading of the cartridge 3 is possible, i.e., whether photography is possible. This determination is made by determining whether a flag B has been set using the processes in FIGS. 7 and 8. If the determination is negative, the CPU advances to step S11 and concludes the process by displaying a warning to the effect that loading is not possible.

If the determination in step S10 is affirmative, the CPU advances to step S12 and causes the spool driving unit 4 to rotate. As a result, the disk 9 on top of the cartridge 3 on which the bar code pattern B is affixed rotates. Light emitted from the light-emitting element 51 of the photo-reflector 5 is reflected from the bar code pattern B and is incident on the light-receiving element 52. In addition, because the reflectivity of the black portions of the bar code pattern B is lower than the reflectivity of the white portions, the amount of light incident on the light-receiving element 52 after the light is reflected by the black portions is less than the amount of light reflected from the white portions. Accordingly, the CPU 12 can detect the information represented in the bar code pattern by detecting the difference in light quantities.

In step S13, the detected bar code pattern information is stored in a memory (FIG. 3). In step S14, a table of correspondences, between the bar code pattern and film classifications is read from a ROM (not shown). This process is concluded by comparing the information from the memory with the bar code pattern B to specify the film classification.

Figure 6:
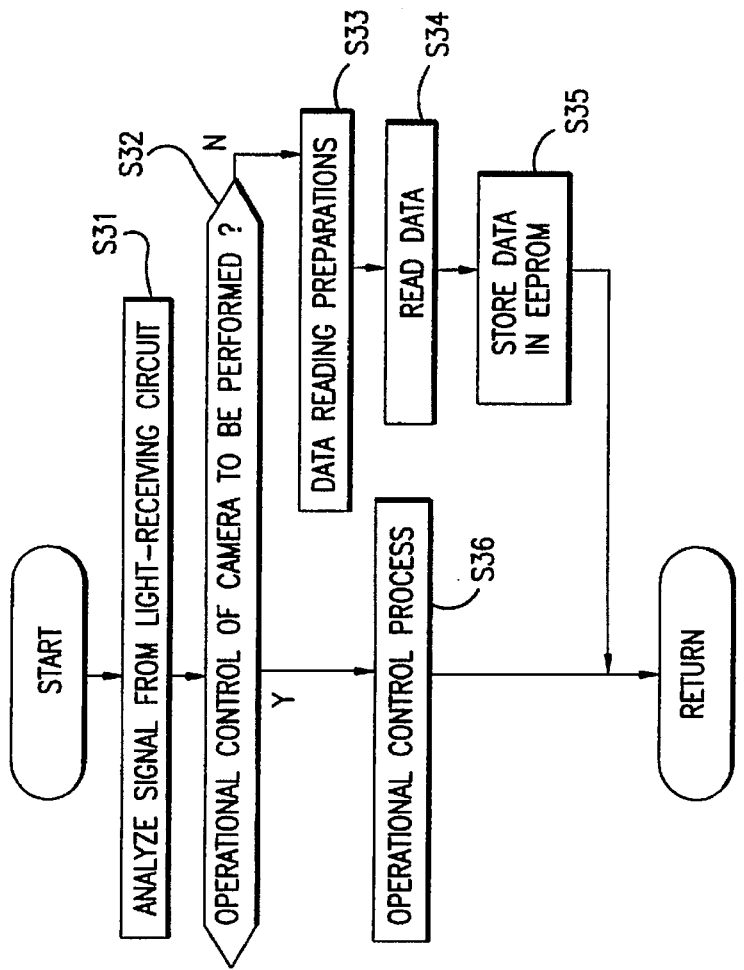
FIG. 6 is a flowchart showing the data communications process executed by the CPU.
Figure 5:
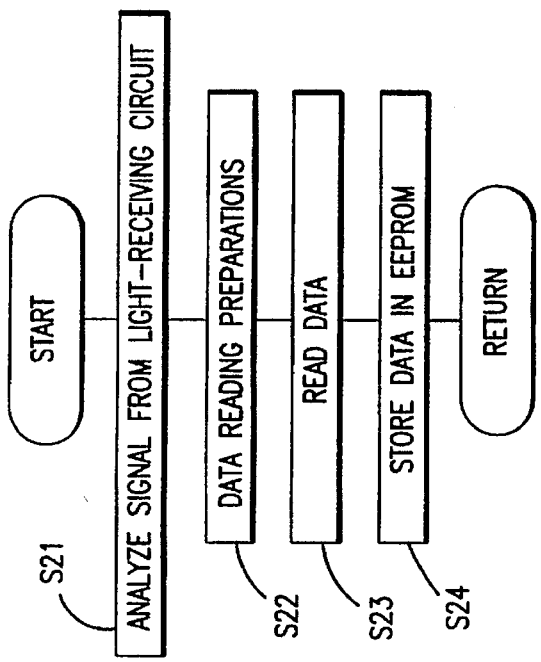
FIG. 5 is a flowchart showing the data communications process executed by the CPU.

FIGS. 5 and 6 are flowcharts showing the data communication processes performed by the present invention if the determination in step S3 is affirmative. FIG. 5 shows a flowchart for a case in which data communication is performed to transmit data (such as adjustment values or other settings) from the PC 11 to the camera 1. FIG. 6 shows a flowchart for a case in which the operation of the camera 1 is controlled from the PC 11 by transmitting other values, e.g., if controlling lens driving and opening and closing of the shutter are performed.

In step S21 of FIG. 5, the signal from the light-receiving circuit 54 is analyzed. The CPU 12 detects the type of communication command that was sent from the PC 11. In step S22, preparations are performed for data reading in accordance with the communication command detected in step S21. For example, if the communication command that has been sent is a command to read the adjustment values for automatic exposure, the address in the EEPROM 17 that is used for storing such adjustment values is set. In step S23, data sent after the communication command is read. In step S24, the CPU 12 stores this data at a predetermined address in the EEPROM 17 and then returns.

On the other hand, in step S31 of FIG. 6, an analysis is made of the type of communication command that was sent, similar to step S21 in FIG. 5. In step S32, a determination is made as to whether operational control of the camera 1 is to be performed by the PC 11 on the basis of the results of the analysis conducted in step S31. If the determination is negative, i.e., when adjustment values from the PC 11 are to be read by the CPU 12, the CPU advances to step S33 and performs processes similar to those in steps S22 to S24 of FIG. 5 and then returns.

If the determination in step S32 is affirmative, however, the CPU 12 advances to step S36 and performs operational control processes, and then returns. In these operational control processes, commands are received from the PC 11. When a command in the form of an optical signal is incidental on the light-receiving element 52, the command is analyzed and then executed. Accordingly, in addition to driving the lens and opening and closing the shutter from the PC 11, the exposure mode, the diaphragm value, the shutter speed and other values can be set from the PC 11.

According to the present invention as shown in FIGS. 4 to 6, the light-receiving element 52 of the camera photo-reflector 5 begins operating before the light-emitting element 51, and when light is input into the light-receiving element 52 within a predetermined time interval after the light-receiving element 52 has begun operating, data communication is performed automatically. Therefore, a dedicated switch for commanding data communication (versus ordinary film cartridge reading, for example) is unnecessary. In addition, because data communication is performed using a photo-reflector 5 that reads film data and is already existing in the cartridge chamber 2, an additional communication terminal for data communication need not be provided. As a result, costs are reduced. Furthermore, a dummy cartridge 8 having the same shape as a normal cartridge 3 can be loaded into the cartridge chamber such that the photo-reflector 10 for data communication is mounted on the top surface of the dummy cartridge 8 opposite the photo-reflector 5 in the cartridge chamber 2. Consequently, data communication can be performed without providing a dedicated data communication device, e.g., a terminal on the camera. Additionally, the optical elements of the photo-reflectors 5 and 10 are not subject to wear due to friction as are DX code terminals.

FIGS. 7 and 8 are flowcharts showing details of the cartridge information detection process of step S7 in FIG. 4. If a switch is provided that is turned on when a cartridge 3 is loaded into the cartridge chamber 2 (not shown), the CPU 12 executes the processes shown in FIG. 7. If such a switch is not provided, the CPU executes the processes shown in FIG. 8. In addition, the flowchart in FIG. 7 explains a case in which the rotational position of the disk 9 on the top surface of the cartridge automatically changes prior to film usage and after all of the photographs have been taken (i.e., when the film cartridge in the camera is used-up). In other words, the position of the disk 9 in this cartridge is set so that the white portions of the bar code pattern B affixed to the disk 9 are opposite the photo-reflector 5 in the cartridge chamber 2 prior to using the film. Correspondingly, the black portions are opposite the photo-reflector 5 after all photographs have been taken.

In step S51 of FIG. 7, a determination is made as to whether the light-receiving element 52 of the photo-reflector 5 is receiving any light. For example, when a cartridge 3 has not been loaded into the cartridge chamber 2, even if the light-emitting element 51 of the photo-reflector 5 emits light, such light is not reflected by anything and, therefore, the light-receiving element 52 does not register receiving any light. If the light from the light-emitting element 51 illuminates the black portions of the bar code pattern, only a small amount of light is reflected. Consequently, the determination in step S51 for this case is also negative. For example, when the black portions of the cartridge 3 are opposite the light-receiving element 52, the determination in step S51 is negative. Accordingly, the determination that photography has already been finished can be made.

If the determination in step S51 is affirmative, the CPU 12 moves to step S52 and a determination is made that loading is possible. After this determination, the CPU 12 sets flag A and flag B (e.g., to value of "1") and returns. If the determination in step S51 is negative, the CPU moves to step S53, and a determination is made as to whether the switch provided in the cartridge chamber is on. (Typically a switch is provided in the cartridge chamber, the switch being physically contacted and placed into the ON position when a film cartridge is present.) If the determination is negative, the CPU 12 advances to step S54, determines that a cartridge 3 has not been loaded into the cartridge chamber 2, resets flag A (e.g., to a value of "0") indicating this condition, and returns. On the other hand, if the determination in step S53 is affirmative, the CPU 12 advances to step S55, determines that (although a film cartridge is present) loading is impossible, i.e., that photography is impossible, resets flag B (e.g., to a value of "0") that indicates this condition, and returns.

In step S61 of FIG. 8, the same determination process as in step S51 is performed. If this determination is affirmative, the CPU 12 advances to step S62, performs the same process as in step S52, and returns. If the determination in step S61 is negative, the CPU 12 advances to step S63 and causes the spool driving unit 4 to rotate. As a result, the disk 9 to which the bar code pattern B is affixed rotates. In step S64, the determination is made as to whether or not the light-receiving element 52 is receiving light. If this determination is negative, the CPU 12 advances to step S65, performs the same processes as in step S54, and returns. On the other hand, if the determination in step S64 is affirmative, the CPU 12 moves to step S66, performs the same process as in step S55, and then returns.

According to the processes shown in FIGS. 7 and 8, whether film loading is possible is determined by detecting if the color of the bar code pattern B at the position opposite the photo-reflector 5 changes prior to photography and after all photographs have been taken. As a result, this determination can be performed easily and quickly. In addition, in FIG. 7 whether a cartridge 3 is loaded is determined according to the state (i.e., ON or OFF) of a switch provided in the cartridge chamber 2. Accordingly, detection of cartridge loading can also be performed quickly. In FIG. 8, determining whether a cartridge is loaded requires using reflections from the bar code B as the disk 9 is rotated. Although this determination process require more time than the process of FIG. 7, the cartridge loading detection switch is unnecessary, which helps reduce costs.

In the first embodiment, the determination as to whether to perform data communication is made by operating the light-receiving element 52 of the photo-reflector 5 prior to operating the light-emitting element 51. In contrast, in the second embodiment that is described below, the light-emitting element 51 and the light-receiving element 52 are operated simultaneously. Because the second embodiment corresponds to the first embodiment shown in the diagrams, with the exception of the processes performed by the CPU 12, the explanation of the second embodiment that follows describes only the processes of the CPU 12.

Figure 9:
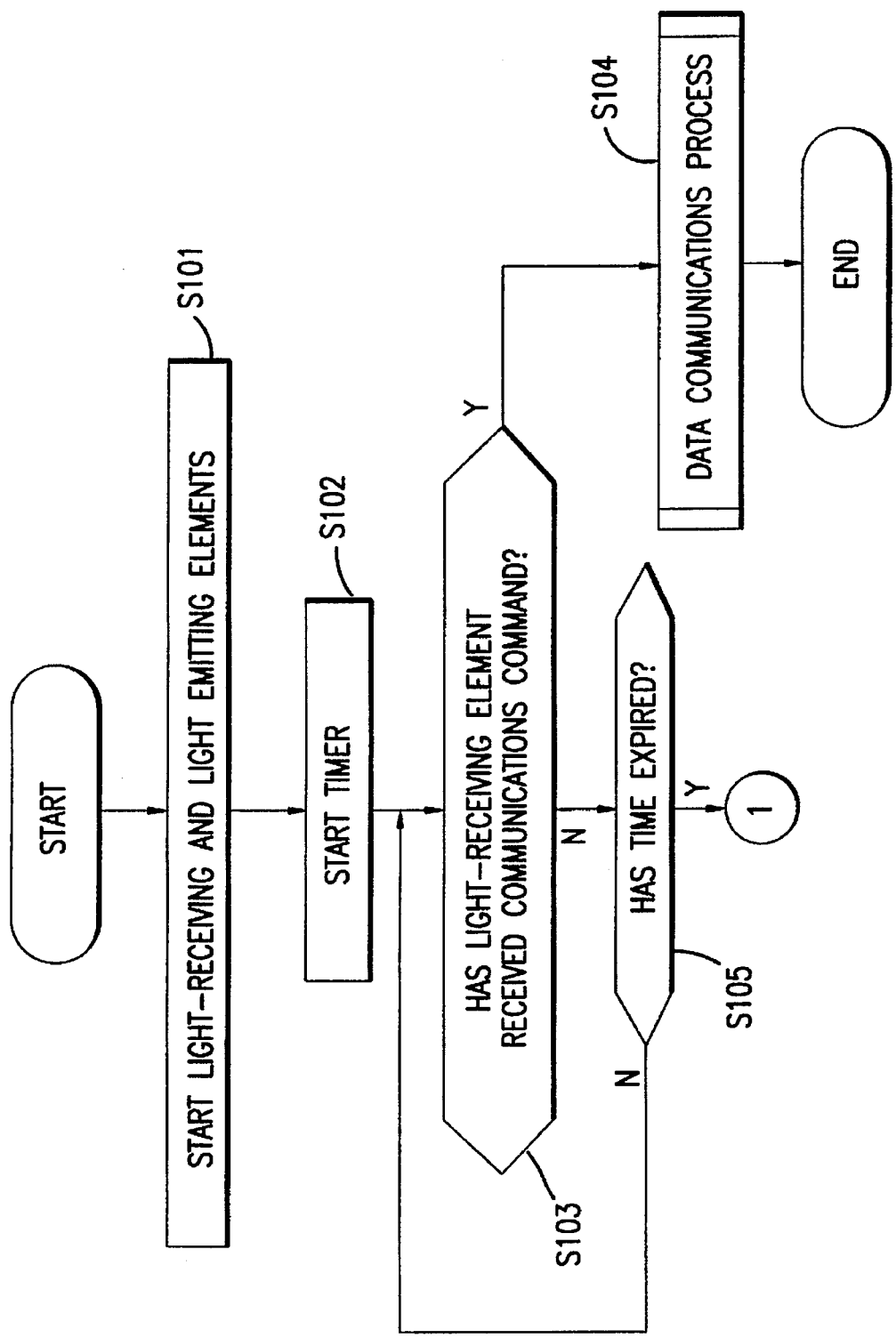
FIG. 9 is a flowchart showing the processes performed by the CPU according to a second embodiment of the invention.

Referring to FIG. 9, when the back cover U is detected to be in a closed position according to the state of the back cover detection switch 19, the CPU 12 begins the FIG. 9 processes. In step S101, start signals are sent to both the light-emitting circuit 53 and the light-receiving circuit 54. As a result, the light-emitting element 51 begins emitting light toward the cartridge chamber 2, and the light-receiving element begins receiving optical signals. In step S102, a timer is started that measures the elapsed time since the light-emitting element 51 and the light-receiving element 52 were initiated.

In step S103, a determination is made as to whether an optical signal indicating a communication command has been received by the light-receiving element 52. If this determination is affirmative, the CPU 12 advances to step S104, performs the data communication processes shown in FIGS. 5 and 6, performs operational control of the camera through reading data or through the PC, and then concludes the processes.

On the other hand, if the determination in step S103 is negative, the CPU advances to step S105 and determines whether time has expired. If this determination is negative, the CPU returns to step S103. If the determination is affirmative, the CPU performs the cartridge information detection process starting with step S6 in FIG. 4, and the processes are concluded.

Accordingly, the light-emitting element 51 and the light-receiving element 52 of the photo-reflector 5 are started simultaneously in the second embodiment, and if an optical signal indicating a communication command is received within a predetermined time interval after these operations have commenced, data communication is performed automatically. Consequently, the second embodiment does not require starting the operation of the light-emitting element 51 after the light-receiving element 52, as is the case in the first embodiment.

In the first and second embodiments, if data communication is performed between the camera 1 and a PC 11, the camera 1 only receives data from the PC 11. In contrast, in the third embodiment that is explained below, the camera 1 can also send data to the PC 11. Accordingly, two-way communication can be performed between the camera 1 and the PC 11. Because the third embodiment corresponds to the first embodiment, except for the processes performed by the CPU 12, the explanation of the third embodiment that follows describes only the processes of the CPU 12.

Figure 10:
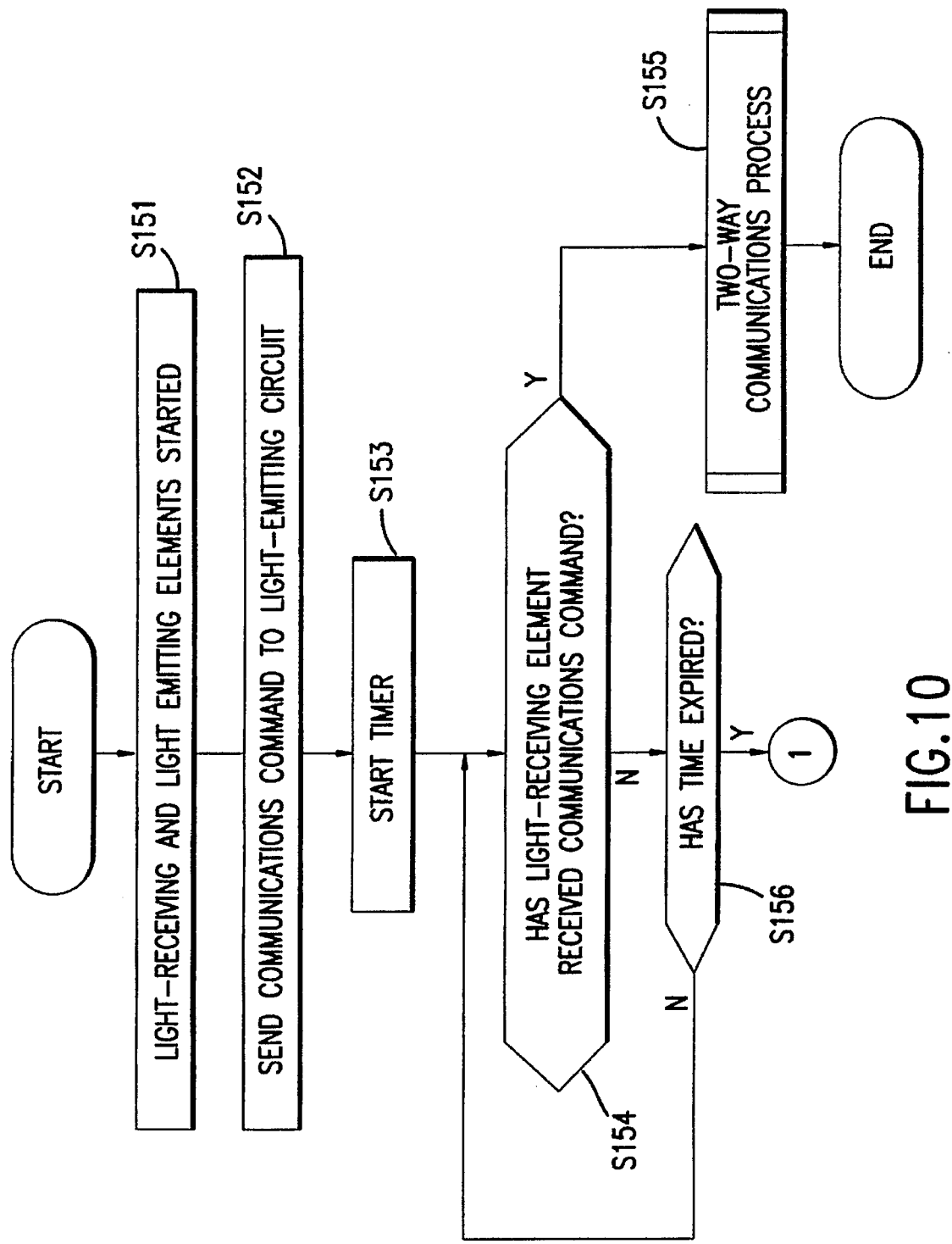
FIG. 10 is a flowchart showing processes performed by the CPU according to a third embodiment of the invention.

Referring to FIG. 10, when the back cover detection switch detects that the back cover U is closed, the CPU 12 begins the processes shown in the flowchart in FIG. 10. In step S151, both the light-emitting element 51 and the light-receiving element 52 are started the same as in step S101 of FIG. 9. In step S152, a communication command is sent to the light-emitting circuit 53. As a result, an optical signal corresponding to the communication command is emitted from the light-emitting element 51 toward the cartridge chamber 2. In step S153, a timer is started, and the optical signal is received by the light-receiving element 52 of the dummy cartridge 8 and is sent to the PC 11. The PC 11, by the fact that a communication command has been received from the camera 1, verifies that a state exists in which communication can be performed with the camera 1, and sends a signal in response to the dummy cartridge 8. The photo-reflector 10 of the dummy cartridge 8 changes the response signal into an optical signal, and emits the optical signal toward the camera 1.

In step S154, a determination is made as to whether the light-receiving element 52 of the photo-reflector 5 has received an optical signal indicating a communications command. If this determination is affirmative, a determination is made that a state exists in which communication with the PC 11 can be performed, so the CPU advances to step S155 and performs two-way communication. Thus, two-way communication is enabled, and photographic conditions such as exposure information and other settings are sent from the camera 1 to the PC 11, or the lens of the camera is driven by commands from the PC 11.

On the other hand, if the determination in step S154 is negative, the CPU 12 advances to step S156 and a determination is made as to whether time has elapsed. If the determination is negative, the CPU 12 returns to step S154. If the determination is affirmative, the CPU 12 moves to step S6 in FIG. 4, performs the cartridge information detection process and the processes, are concluded.

Accordingly, with the third embodiment, a communications command is sent to the cartridge chamber 2 from the camera 1 after the photo-reflector 5 has commenced operating, and if there is a response to the communications command within a predetermined time interval, a determination is made that a dummy cartridge 8 has been loaded and that communication with the PC is possible. Consequently, a dedicated switch for commanding the communication to begin is unnecessary. In addition, because a command indicating that communication is possible is sent from the camera 1 to the PC 11 after preparations for communications are completed in the camera 1, data communications can proceed smoothly. Furthermore, with this third embodiment, because data can be sent from the camera 1 to the PC 11, complex data communication can be performed e.g., enabling the PC 11 to both operate the camera 1 and to receive the results of this operation.

The fourth embodiment is such that data communication is performed with a PC 11 only when data communication is commanded by means of a switch (not shown) provided at a certain location in the camera 1. Other than the provision of the switch, this fourth embodiment also differs from the first embodiment only in the processes performed by the CPU 12. Accordingly, the following explanation describes only the processes of the CPU 12.

Figure 11:
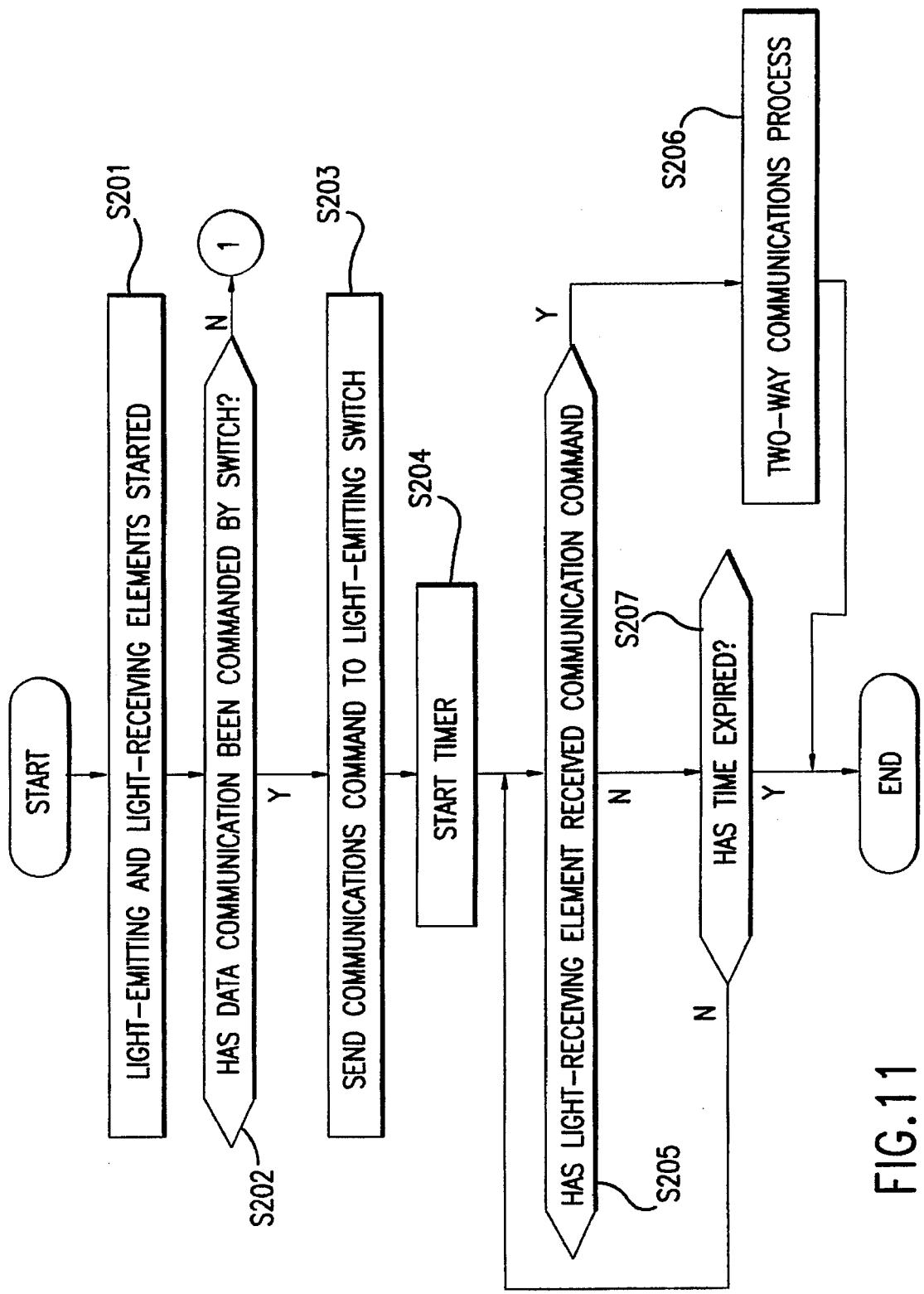
FIG. 11 is a flowchart showing processes performed by the CPU according to a fourth embodiment of the invention.

Referring to FIG. 11, when the back cover U is detected to be in a closed position according to the state of the back cover detection switch 19, the CPU 12 begins the FIG. 11 processes. In step S201, both the light-emitting element 51 and the light-receiving element are started as in step S101 of FIG. 9. In step S202, a determination is made as to whether data communication is to be performed based on the state of a switch (not shown). If the determination is negative, the CPU 12 moves to step S6 in FIG. 4, and performs the cartridge information detection process.

On the other hand, if the determination in step S202 is affirmative, the CPU 12 advances to step S203 and sends a communication command to the light-emitting circuit 53 similar to step S152 of FIG. 10. As a result, an optical signal corresponding to the communication command is emitted from the light-emitting element 51 toward the cartridge chamber 2. In step S204, a timer is started, and in step S205, a determination is made as to whether the light-receiving element 52 has received an optical signal. If the determination is affirmative, the CPU 12 advances to step S206, and performs a two-way communication process the same as in step S155 of FIG. 10. On the other hand, if the determination in step S205 is negative, the CPU advances to step S207, and determines whether time has expired. If the determination is negative, the CPU returns to step S205; if the determination is affirmative, the process is completed.

Accordingly, with the fourth embodiment, when a cartridge 3 is loaded into the cartridge chamber 2, the determination as to whether to perform data communication or to perform film cartridge discrimination is made using a switch that commands data communication. Consequently, the determination as to whether or not to perform data communication can be made easily and quickly. Alternatively, the function of the switch that commands data communication described above can be performed by another switch having one or more other functions such that a dedicated switch need not be provided.

In the first through fourth embodiments, if the sending and receiving of data is performed asynchronously, data mutation and missing data errors can occur. Accordingly, data should be sent preferably using the so-called self clocking method in which data and a synchronous clock signal for data communication are overlapped.

Figure 12:
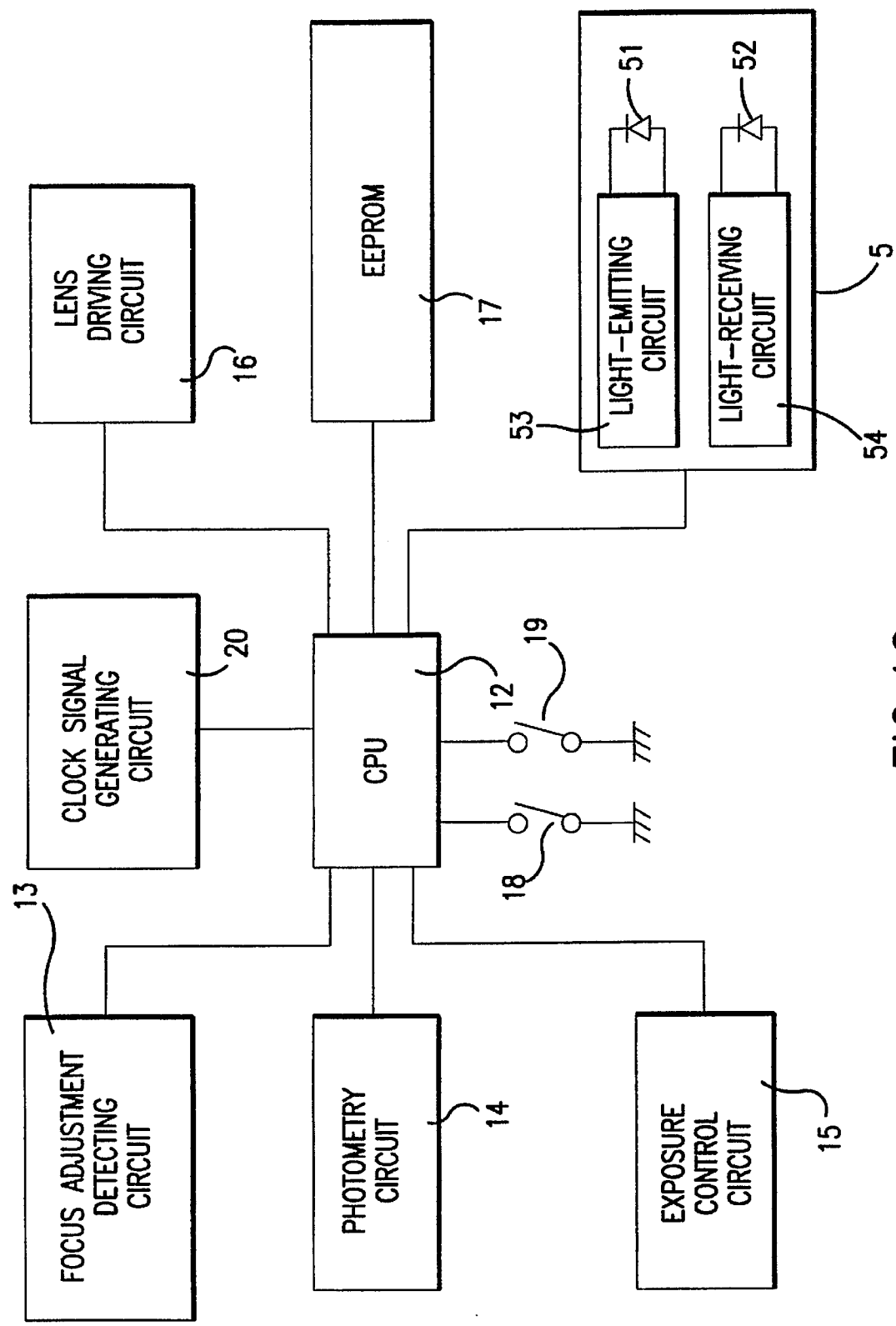
FIG. 12 is a block diagram of a fifth embodiment of a camera with communications capability.

The fifth embodiment is a variation on the first embodiment, in which a clock signal is sent from the camera 1 to the PC 11. Communication commands and data are sent from the PC 11 to the camera 1 synchronously with this clock signal. FIG. 12 is a block diagram of the present invention according to the fifth embodiment, which corresponds to the first embodiment shown in FIG. 3, but also includes a clock signal generating circuit 20. The clock signal generating circuit 20 divides the frequency of the operating clock (system clock) of the CPU 12 to create a clock signal for data communications.

Figure 13:
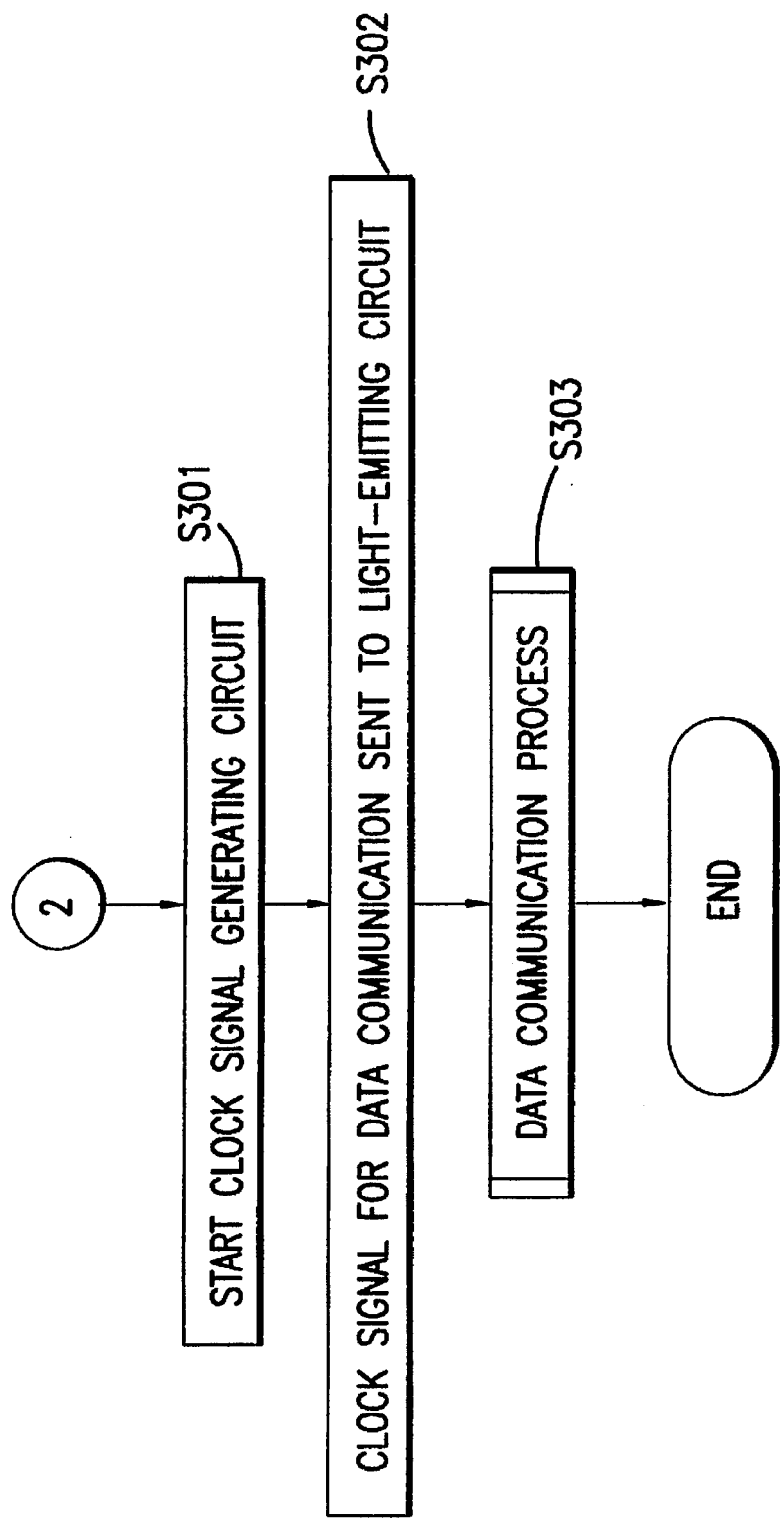
FIG. 13 is a flowchart showing processes performed by the CPU according to the fifth embodiment.

The processes of the CPU 12 in the fifth embodiment are similar to the processes of the first embodiment, but as shown in FIG. 13, the data communication processes are different. The processes in FIG. 13 are started if the determination in step S3 of FIG. 4 is affirmative.

Referring to FIG. 13, the clock signal generating circuit 20 is started in step S301 and, as a result, a clock signal for data communications is output from the clock signal generating circuit 20. In step S302, the clock signal for data communications is sent to the light-emitting circuit 53. The clock signal is converted into an optical signal that is emitted from the light-emitting element 51. The optical signal is received by the photo-reflector 10 on the top surface of the dummy cartridge 8 and converted into an electrical signal. The electrical signal is sent to the PC 11. The PC 11 sends communication commands and data to the dummy cartridge 8 synchronously with the clock signal. These signal commands and data are converted into optical signals by the dummy cartridge 8, and are emitted from the photo-reflector 10 toward the camera 1.

In step S303, the data communication processes of FIG. 5 or FIG. 6 are performed. In other words, the communication commands are analyzed, data sent as a result of these commands are stored in a predetermined address in the EEPROM 17, and timing control during the data communication process is facilitated.

In this way, with the fifth embodiment, when data communication is performed with the PC 11, a clock signal is sent beforehand from the camera 1 to the PC 11, and data communication is performed synchronously with the clock signal. Consequently, problems such as data mutation and data destruction during data communication are effectively prevented.

In each of the first five embodiments, data communication is performed using a photo-reflector 5 pre-established in the cartridge chamber 2 that reads film information. In contrast, the invention according to a sixth embodiment includes an additional photo-reflector specifically for data communication. Accordingly, data communication is performed using a total of two photo-reflectors.

Figure 14:
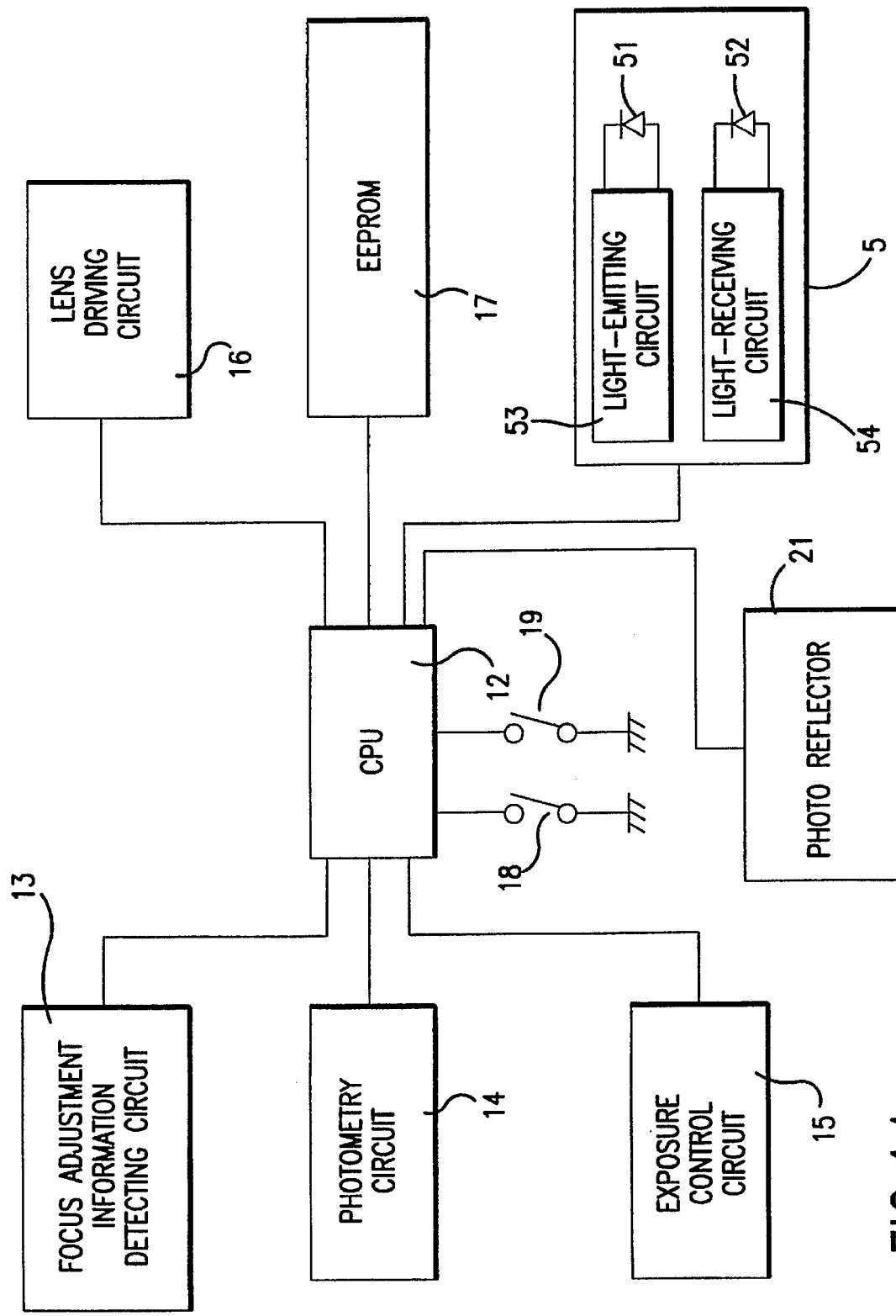
FIG. 14 is a block diagram of a sixth embodiment of a camera with communications capability.

FIG. 14 is a block diagram of a camera according to the sixth embodiment, and the structure is that of the first embodiment shown in FIG. 3 with the addition of a second photo-reflector 21. The second photo-reflector 21 can be mounted, for example, adjacent the first photo-reflector 5 provided in the cartridge chamber 2 of the earlier embodiments. In addition, a second photo-reflector is also provided on the dummy cartridge 8 to enable the sending and receiving of optical signals to and from the photo-reflector 21. In the sixth embodiment, the CPU 12 performs the same processes as shown in the flowchart for the first embodiment shown in FIG. 4, with the exception of the data communication processes.

Figure 15:
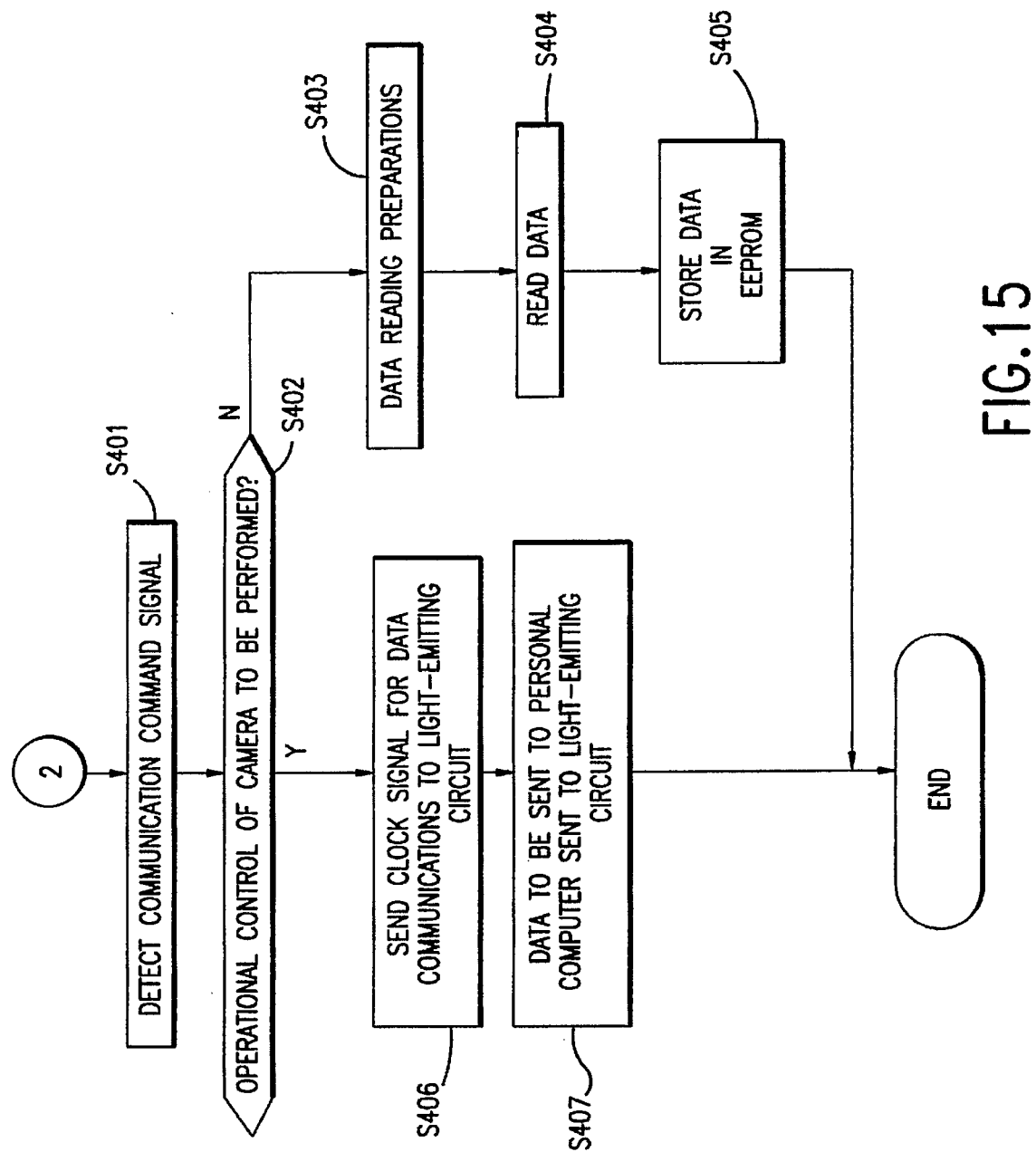
FIG. 15 is a flowchart showing processes performed by the CPU according to the sixth embodiment.

FIG. 15 is a flowchart showing the data communication processes performed by the CPU 12 in the sixth embodiment. The processes in FIG. 15 are initiated if the determination in step S3 of FIG. 4 is affirmative. In step S401, the CPU analyzes the signals from the light-receiving circuit 54 and determines what type of communications command has been sent from the PC 11. In step S402, a determination is made as to whether operational control of the camera 1 is to be performed from the PC 11. If the determination is negative, the CPU advances to step S403, and performs the same processes as in steps S22 to S24 of FIG. 5 before returning.

If the determination in step S402 is affirmative, the CPU advances to step S406 and a clock signal for data communication is sent to the second photo-reflector 21. As a result, an optical signal corresponding to the clock signal for data communication is output from the second photo-reflector 21. In step S407, data to be sent to the PC 11 is sent to the light-emitting circuit 53 and the data is converted into an optical signal that is emitted from the light-emitting element 51 of the first photo-reflector 5. The optical signal is converted into an electrical signal by the dummy cartridge 8 and is sent to the PC 11. In addition, when the PC 11 sends communication commands and data to the camera 1, the data is sent via the light-emitting element of the second photo-reflector 10 synchronously with the clock signal output from the second photo-reflector 21.

According to the sixth embodiment, two photo-reflectors are provided, one of which is specifically used for the clock signal while the other is specifically used for data. Consequently, the efficiency of the data communication is enhanced because the effects of noise can be avoided.

As described above, in the sixth embodiment data communication is performed using a plurality of photo-reflectors, an example of which was shown wherein a photo-reflector used for film information detection is employed as one of the photo-reflectors. However, it is not necessary for the other photo-reflector to be designated for data communication, it also being acceptable to use a photo-reflector pre-established in the camera for other purposes.

In each of these six embodiments, when data communication is performed between the camera and the PC, the data is sent in serial form. However, providing as many photo-reflectors as there are data bits such that the data can be sent in parallel is also possible. As a result, the speed of data transmission can be improved.

In the embodiments described, an example is presented wherein data communication is performed using a dummy cartridge that has no bar code. However, it would also be acceptable to perform data communication using a dummy cartridge with a bar code while also conducting film information reading tests. In such a case, the bar code need not be provided on the top surface of the cartridge; the bar code can be provided, e.g., on the side surface of the cartridge. Preferably, a photo-reflector is disposed at a predetermined location in the cartridge chamber opposite the bar code.

Although the embodiments described above include a photo-reflector, an optical element other than a photo-reflector, such as, e.g., a photo-interrupter, can also be used. In addition, when data communication is performed only for the purpose of transmitting data from the PC into the camera, providing a single light-emitting element in the dummy cartridge and a single light-receiving element in the camera in place of the photodetector achieves the same result.

Furthermore, the cartridge can be loaded and removed through a cartridge insertion opening instead of the back cover.

As explained in detail above, with the present invention, a special system to conduct data communications is unnecessary because data communication between the external device and the camera is made possible by providing a loadable dummy cartridge in the cartridge chamber. In addition, a second optical element is provided on the dummy cartridge to enable light signals to be emitted toward the first optical element, which is pre-established in the camera for the purpose of reading a bar code on a film cartridge. Consequently, providing a dedicated communication terminal for data communications is unnecessary.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An apparatus that can communicate with an external device, said apparatus comprising:
an apparatus photoelectric element having a light-emitting element and a light-receiving element, said apparatus photoelectric element being located in a film cartridge chamber of said apparatus; and
a controller electrically coupled with said apparatus photoelectric element, said controller activating the light-receiving element prior to activating the light-emitting element and determining whether to communicate with an external device in response to output of the light-receiving element activated prior to the light-emitting element, said controller communicating with the external device by transmission of signals using said apparatus photoelectric element when said controller determines to communicate with the external device.

2. The apparatus of claim 1, wherein said controller sends data signals to the external device with said light-emitting element.

3. The apparatus of claim 2, wherein the apparatus light-receiving element receives data signals from the external device and transmits the signals as electrical signals to said controller such that said controller receives the data from the external device.

4. The apparatus of claim 3, wherein said controller is also capable of receiving data in the form of electrical signals using said light-receiving element from a film cartridge located in said cartridge chamber when said controller determines not to communicate with the external device.

5. The apparatus of claim 4, wherein said controller determines whether an electrical signal representing a signal received by said light-receiving element was originated by an external device or reflected by a film cartridge located in said cartridge chamber.

6. The apparatus of claim 1, wherein said light-receiving element receives data signals from the external device and transmits the signals as electrical signals to said controller such that said controller receives the data from the external device.

7. The apparatus of claim 6, wherein said controller determines whether to communicate with the external device by determining whether said light-receiving element receives a data signal indicated by an electrical signal transmitted to said controller within a predetermined time period after actuation of said light-receiving element.

8. The apparatus of claim 7, wherein said light-emitting element receives data from said controller as electrical signals and sends the data signals to the-external device, said controller maintaining said light-emitting element in an OFF-state during said predetermined time period.

9. The apparatus of claim 1, further comprising a clock signal generating circuit coupled to said light-emitting element, said light-emitting element receiving an electrical clock signal generated by said clock signal generating circuit and transmitting said clock signal to the external device.

10. The apparatus of claim 9, wherein said light-receiving element receives data signals from the external device and transmits the data as electrical signals to said controller.

11. The apparatus of claim 10, wherein said light-emitting element includes a first light-emitting element and a second light-emitting element, said first light-emitting element transmitting said clock signal data to the external device, and said second light-emitting element sending data signals representing data received from the controller to the external device.

12. The apparatus of claim 11, wherein said apparatus is a camera.

13. An apparatus communications control system comprising:
an apparatus having an apparatus photoelectric element including an apparatus light-emitting element and an apparatus light-receiving element located in a film cartridge chamber of said apparatus;
an external device located externally from said apparatus, said external device including a dummy cartridge that is insertable into said film cartridge chamber of said apparatus, said dummy cartridge having a cartridge photoelectric element located so that said cartridge photoelectric element opposes said apparatus photoelectric element when said dummy cartridge is inserted into said film cartridge chamber of said apparatus;
a controller electrically coupled with said apparatus photoelectric element, said controller determining whether to communicate with said external device using said apparatus photoelectric element, said controller activating the apparatus light-receiving element prior to activating the apparatus light-emitting element and communicating with said external device by transmission of light signals between said apparatus photoelectric element and said cartridge photoelectric element when said controller determines to communicate with said external device in response to output of the apparatus light-receiving element activated prior to the apparatus light-emitting element.

14. The apparatus communications control system of claim 13, wherein said apparatus light-emitting element receives data in he form of electrical signals from said controller and sends data signals to said external device.

15. The apparatus communications control system of claim 14, wherein said cartridge photoelectric element further includes a cartridge light-emitting element, said cartridge light-emitting element being located on said dummy cartridge so that said cartridge light-emitting element opposes said apparatus light-receiving element when said dummy cartridge is inserted into said film cartridge chamber of said apparatus, said apparatus light-receiving element receiving data signals from said external device and transmitting the data as electrical signals to said controller.

16. The apparatus communications control system of claim 15, wherein said controller is also capable of receiving data in the form of electrical signals using said apparatus light-emitting element and said apparatus light-receiving element from a film cartridge located in said cartridge chamber when said controller determines not to communicate with said external device.

17. The apparatus communications control system of claim 16, wherein said apparatus light-receiving element receives a light signal and transmits the light signal as an electrical signal to said controller such that said controller determines whether the light signal was originated by said external device or reflected by a film cartridge located in said cartridge chamber.

18. The apparatus communications control system of claim 13, wherein said apparatus light-receiving element receives data signals from said external device and transmits the data as electrical signals to said controller such that said controller receives the data from said external device.

19. The apparatus communications control system of claim 18, wherein said controller determines whether to communicate with said external device by determining whether said apparatus light-receiving element receives a light signal indicated by an electrical signal transmitted to said controller within a predetermined time period after actuation of said apparatus light-receiving element.

20. The apparatus communications control system of claim 19, wherein said cartridge photoelectric element includes a cartridge light-receiving element, said cartridge light-receiving element being located on said dummy cartridge so that said cartridge light-receiving element opposes said apparatus light-emitting element when said dummy cartridge is inserted into said film cartridge chamber of said apparatus, said apparatus light-emitting element receiving data in the form of electrical signals from said controller and sending the data in the form of light signals to said cartridge light-receiving element which transmits a data signal to said external device, said controller maintaining said apparatus light-emitting element in an OFF-state during said predetermined time period.

21. The apparatus communications control system of claim 13, wherein said cartridge photoelectric element includes a cartridge light-receiving element, and said apparatus further comprises a clock signal generating circuit coupled to said apparatus light-emitting element, said apparatus light-emitting element receiving an electrical clock signal generated by said clock signal generating circuit and transmitting the clock signal as a light signal to said cartridge light-receiving element, said cartridge light-receiving element transmitting the clock signal to said external device.

22. The apparatus communications control system of claim 21, wherein said cartridge photoelectric element further includes a cartridge light-emitting element, said cartridge light-emitting element being located on said dummy cartridge so that said cartridge light-emitting element opposes said apparatus light-receiving element when said dummy cartridge is inserted into said film cartridge chamber of said apparatus, said apparatus light-receiving element receiving data in the form of light signals from said cartridge light-emitting element which receives data signals from said external device, said apparatus light-receiving element transmitting the data to said controller as electrical signals.

23. The apparatus communications control system of claim 22, wherein said apparatus light-emitting element includes a first apparatus light-emitting element and a second apparatus light-emitting element, and said cartridge light-receiving element includes a first cartridge light-receiving element and a second cartridge light-receiving element.

24. The apparatus communications control system of claim 23, wherein said first apparatus light-emitting element receives an electrical clock signal generated by said clock signal generating circuit and transmits said clock signal as a light signal to said first cartridge light-receiving element which transmits said clock signal to said external device, and said second apparatus light-emitting element receives data from said controller in the form of electrical signals and sends the data in the for of light signals to said second cartridge light-receiving element which transmits data signals to said external device.

25. The apparatus communications control system of claim 13, wherein said apparatus is a camera.

26. A method of communicating between an apparatus and an external device located externally of said apparatus, said apparatus having an apparatus photoelectric element including an apparatus light-emitting element and an apparatus light-receiving element located in a film cartridge chamber of said apparatus, said method comprising:

activating the apparatus light-receiving element prior to activating the apparatus light-emitting element;

determining whether said external device is linked to said apparatus photoelectric element in response to output of the apparatus light-receiving element activated prior to the apparatus light-emitting element; and communicating with said external device by transmitting light signals using said apparatus photoelectric element when the controller determines that said external device is linked to said apparatus photoelectric element.

27. The method of claim 26, wherein said apparatus is a camera.

28. The method of claim 26, wherein said external device includes a dummy cartridge that is insertable into said film cartridge chamber of said apparatus, said dummy cartridge including a cartridge photoelectric element located on said dummy cartridge so that said cartridge photoelectric element opposes said apparatus photoelectric element when said dummy cartridge is inserted into said film cartridge chamber of said apparatus.

29. The method of claim 28, wherein said cartridge photoelectric element includes a cartridge light-emitting element and wherein said step of communicating with said external device includes receiving data with said apparatus light-receiving element in the form of light signals from said cartridge light-emitting element based on data signals from said external device.

30. The method of claim 29, wherein said step of determining whether said external device is linked to said apparatus photoelectric element includes determining whether said apparatus light-receiving element receives a light signal within a predetermined time period after actuation of said apparatus light-receiving element.

31. The method of claim 28, wherein said step of determining is performed based upon light signals transmitted by said external device through said cartridge photoelectric element.

32. The method of claim 28, wherein said cartridge photoelectric element includes a cartridge light-receiving element, and wherein said step of communicating with said external device includes sending data signals to said external device with said apparatus light-emitting element.

33. The method of claim 32, wherein said cartridge photoelectric element further includes a cartridge light-emitting element, said cartridge light-emitting element being located on said dummy cartridge so that said cartridge light-emitting element opposes said apparatus light-receiving element when said dummy cartridge is inserted into said film cartridge chamber of said apparatus, and wherein said step of communicating with said external device includes receiving data with said apparatus light-receiving element in the form of light signals from said cartridge light-emitting element based on data signals from said external device.

34. The method of claim 33, wherein said apparatus is also capable of receiving data from a film cartridge located in said cartridge chamber using said apparatus light-emitting element and said apparatus light-receiving element when it is determined that said external device is not linked to said cartridge photoelectric element.

35. The method of claim 34, wherein said step of determining whether said external device is linked to said apparatus photoelectric element includes determining whether a light signal received by said apparatus light-receiving element was originated by said external device or reflected by a film cartridge located in said cartridge chamber.

36. The method of claim 28, wherein said cartridge photoelectric element includes a cartridge light-receiving element, and further comprising transmitting a clock signal from a clock signal generating circuit in said apparatus to said external device through said apparatus light-emitting element and said cartridge light-receiving element.

37. The method of claim 36, wherein said cartridge photoelectric element further includes a cartridge light-emitting element, said cartridge light-emitting element being located on said dummy cartridge so that said cartridge light-emitting element opposes said apparatus light-receiving element when said dummy cartridge is inserted into said film cartridge chamber of said apparatus, and wherein said step of communicating with said external device includes receiving data with said apparatus light-receiving element in the form of light signals from said cartridge light-receiving element based on data signals from said external device.

38. The method of claim 37, wherein said apparatus light-emitting element includes a first apparatus light-emitting element and a second apparatus light-emitting element, and said cartridge light-receiving element includes a first cartridge light-receiving element and a second cartridge light-receiving element.

39. The method of claim 38, wherein said step of communicating with said external device includes receiving an electrical clock signal generated by said clock signal generating circuit with said first apparatus light-emitting element and transmitting said clock signal as a light signal to said first cartridge light-receiving element which transmits said clock signal to said external device, and receiving data from said controller with said second apparatus light-emitting element in the form of electrical signals and sending the data in the form of light signals to said second cartridge light-receiving element which transmits data signals to said external device.

* * * * *